United States Patent [19]
Freiberg et al.

[11] Patent Number: 5,095,695
[45] Date of Patent: Mar. 17, 1992

[54] METHOD AND APPARATUS FOR CONVERTING HEAT ENERGY OF HOT EXHAUST GASES OF A TEXTILE MACHINE

[75] Inventors: Helge Freiberg, Moenchengladbach; Manfred Pabst, Cologne, both of Fed. Rep. of Germany

[73] Assignee: A. Monforts GmbH & Co., Moenchengladbach, Fed. Rep. of Germany

[21] Appl. No.: 539,988

[22] Filed: Jun. 18, 1990

[51] Int. Cl.$^5$ ............................................... F02G 3/00
[52] U.S. Cl. ................................. 60/39.02; 60/39.07; 34/219
[58] Field of Search ............... 60/39.02, 39.07, 39.12, 60/39.465; 34/212, 219, 224

[56] References Cited

U.S. PATENT DOCUMENTS 2,859,954  11/1958  Grey ........................... 60/39.07

*Primary Examiner*—Louis J. Casaregola
*Assistant Examiner*—Howard R. Richman
*Attorney, Agent, or Firm*—Shefte, Pinckney & Sawyer

[57] ABSTRACT

A method and apparatus for converting heat energy of hot exhaust gases from a treatment chamber of a textile machine into electrical energy is provided. Hot gases exhausted from a treatment chamber of a textile machine of the type which uses heated gases such as, for example, heated air, are conducted to the compressor, combustion chamber and gas turbine assembly of an electric generator for driving of the electric generator. The exhaust gases can thereafter be conducted to a heat exchanger for releasing heat to be returned to the textile machine for use in its operation.

4 Claims, 2 Drawing Sheets

METHOD AND APPARATUS FOR CONVERTING HEAT ENERGY OF HOT EXHAUST GASES OF A TEXTILE MACHINE

BACKGROUND OF THE INVENTION

The present invention relates to a method and apparatus for converting heat energy of hot exhaust gases of a textile machine to a usable energy form.

Certain textile machines such as, for example, tenter frames, include treatment chambers into which heated air is introduced at operating temperatures well above normal room temperatures. The heated treatment chambers release heated exhaust gases during their operations and it is known to conduct these heated exhaust gases through cleaning devices and heat exchange devices to cleanse the exhaust gases of pollutants and then recapture a portion of their heat energy. For example, one known process for handling heated exhaust gases released from the treatment chamber of textile machines includes the initial step of heating the exhaust gases to a temperature approximately in the range of 500° Celsius by conducting the gas through the tubes of a conventional heat exchanger. Thereafter, the now further heated exhaust gases are conducted into a conventional gas or oil-powered combustion chamber in which the gas is heated to a temperature approximately in the range of 750° Celsius for a period of approximately one-half second, which is usually sufficient to effect combustion of substantially all of the contaminants and other pollutants of the exhaust gas.

After the combustion of the contaminants and other pollutants, the exhaust gases, which are now substantially comprised of unpolluted air, are conducted through the tubes of the same heat exchanger which initially heated the exhaust gases upon their exit from the treatment chamber. The travel of the exhaust gases through this heat exchanger effects a cooling of the gases to a temperature in the range of approximately 500° Celsius, which is the temperature to which the initially exhausted gases are heated. Thereafter, the exhaust gases are conducted to another heat exchanger, which is operatively coupled to the treatment chamber, for extracting heat from the exhaust gases to effect heating of the air being introduced into the treatment chamber. This further heat exchange process further cools the exhaust gases to a temperature in the range of approximately 350° Celsius, at which temperature the gases are normally released to the atmosphere.

Although the exhaust gases still retain considerable heat energy after passing through the last heat exchange process, there is typically no use made of this heat energy. Due to factors such as the cost of conducting exhaust gases to a remote location or the non-uniform energy demand for use of such exhaust gases for heating a room or the like, these exhaust gases are typically discharged to the atmosphere with the subsequent waste of their heat energy. Accordingly, the need exists for a method and apparatus to minimize the relative amount of unexpended heat energy still contained in the exhaust gases when the gases are released to the atmosphere.

SUMMARY OF THE INVENTION

The present invention provides a method and apparatus for beneficially and usefully converting the heat energy of gases exhausted from a textile machine into another form of usable energy.

Briefly described, the present invention provides an apparatus for converting heat energy of hot exhaust gases from a treatment chamber of a textile machine into electrical energy. The apparatus includes an electric generator having a combustion chamber for generating electricity by combustion of gases in the chamber and an exhaust gas conduit for introducing the hot exhaust gases into the combustion chamber for combustion therein of contaminants and pollutants and to cause the generator to generate electricity.

The electric generator preferably has a compressor operatively connected to the combustion chamber for compression of the hot exhaust gases prior to their introduction into the combustion chamber.

According to one aspect of the present invention, the apparatus also includes heat exchange means operatively connected to the electrical generator for transferring a portion of the heat energy of the hot exhaust gases exiting the electrical generator to the gases being introduced into the treatment chamber.

The present invention also provides a method for converting heat energy of hot exhaust gases from a treatment chamber of a textile machine into electrical energy. The method includes introducing the hot exhaust gases into the combustion chamber of an electric generator for heating of the hot exhaust gases to a temperature sufficient to effect combustion therein of contaminants and pollutants and to cause the generator to generate electricity.

According to one aspect of the method of the present invention, the method also includes introducing the hot exhaust gases into a compressor of the electric generator for compression thereof prior to the introducing of the hot exhaust gases into the combustion chamber of the electric generator.

According to a further aspect of the method of the present invention, the method also includes transferring in a heat exchange operation a portion of the heat energy of the hot exhaust gases exiting the generator to gases being introduced into the treatment chamber.

DETAILED DESCRIPTION OF THE PREFERRED EMBODIMENTS

Figure 2:
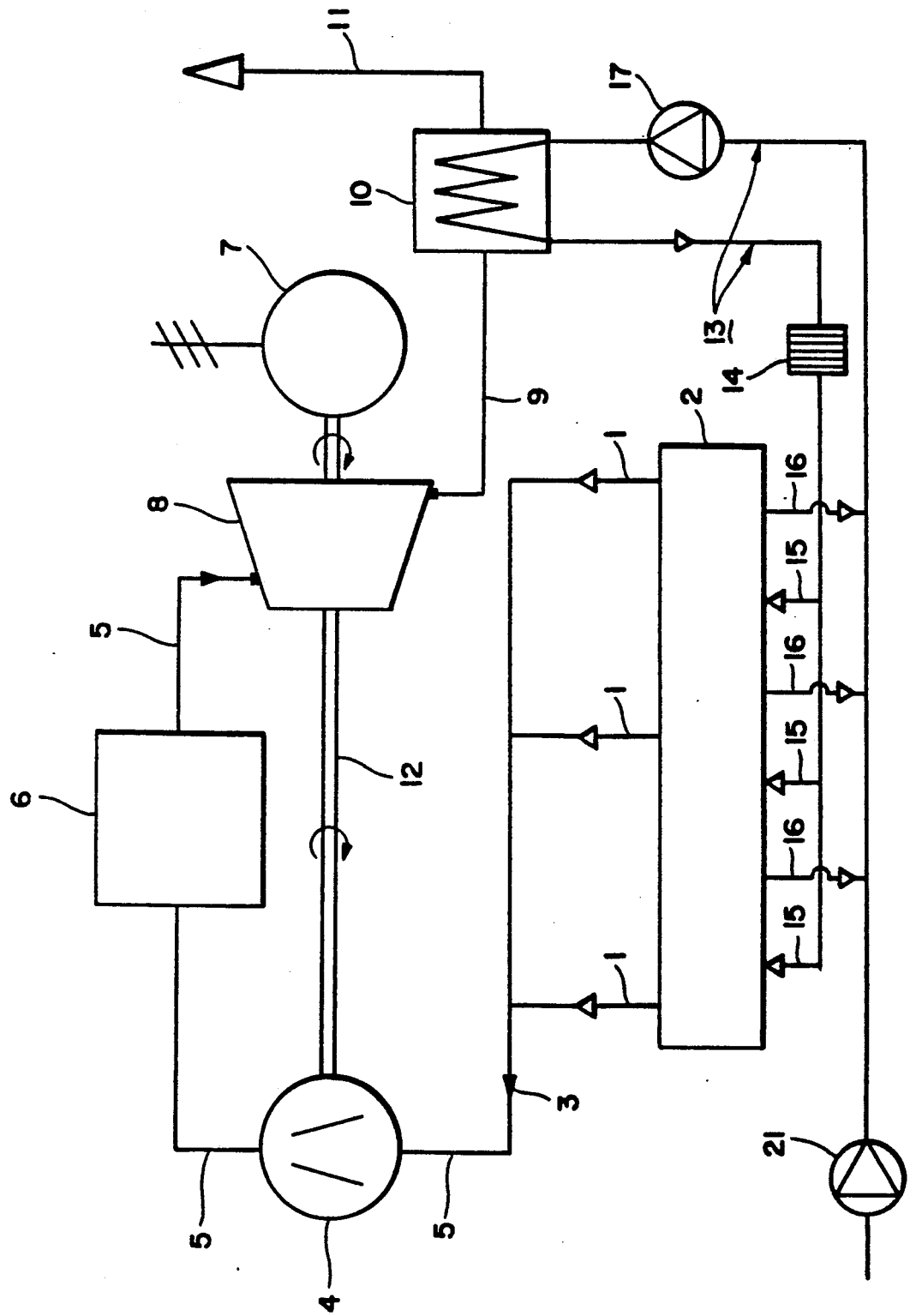
FIG. 2 is a schematic representation of a prior art process for handling the exhaust gases of a textile machine.

In FIG. 2, an exemplary prior art process for handling exhaust gases from a treatment chamber of a textile machine is illustrated. A conventional tenter frame 2, schematically illustrated in FIG. 2, is representative of certain types of textile machines in which heated air is used during the processing of textile material. In the conventional tenter frame 2, textile material is passed through a drying chamber which is maintained at a selected temperature range above the normal room temperature for drying of textile material which is transported through the drying chamber. The heated air within the drying chamber of the tenter frame 2 is exhausted through a plurality of outlets 1 and further processed and then subjected to at least one heat exchange step for recapturing some of the heat of the heated air.

A typical operation for handling exhaust gases such as the heated air exhausted from the drying chamber of a tenter frame is as follows. The exhaust gases are initially conducted through a conventional heat exchange device 18 for adding additional heat to the exhaust gases. For example, the exhaust gases may be further heated to a temperature in the range of approximately 500° Celsius. The heat transferred to the heated exhaust gas in the heat exchanger 18 is obtained from exhaust gases which have been previously exhausted from the tenter frame 2 and heated by combustion, as will be described in more detail below.

The now further heated exhaust gas is conducted through a conduit 5 into the combustion chamber of a conventional burner 6 which includes gas or oil-fueled combustion devices for raising the temperature of the heated gases still further such as, for example, to a temperature in the range of approximately 750° Celsius, to induce combustion of the exhaust gases. The combustion of the exhaust gases is typically conducted for a time period of approximately one-half of a second and this time period is generally sufficient to insure that all of the pollutants, contaminants and other selected components of the exhaust gases are completely combusted.

The now cleansed exhaust gases are conducted through a conduit 19 to the same heat exchanger 18 through which they were initially passed for pre-heating prior to combustion in the burner 6; however, the now cleansed exhaust gases are passed through the heat releasing components of the heat exchanger 18 to effect release of some of the heat of the cleansed exhaust gases to the heat exchanger for transfer thereby to the next following exhaust gases which have just been initially exhausted from the tenter frame 2. As the cleansed exhaust gases exit the heat release components of the heat exchanger 18, they have cooled from the relatively higher temperature in the burner 6 to a relatively lower temperature. For example, the cleansed exhaust gases may cool from 750° Celsius to approximately 500° Celsius.

The cleansed exhaust gases are then conducted through a conduit 20 to a second conventional heat exchanger 10 associated with the tenter frame 2 for effecting release of heat energy from the cleansed exhaust gases for heating the gases being introduced into the drying chamber of the tenter frame. Some of the heated air in the tenter frame 2 is recirculated to the heat exchanger 10 by exhausting of the heated air through a plurality of outlet conduits 16. An air accelerator 17 drives the circulation of the air through the air circulation passage 13. Additionally, an outside air inlet 21 is provided for introducing ambient air into the air circulation passage 13 for mixing with the air exhausted through the outlet conduit 16 A supplemental heater 14 is provided for further heating the air between its travel from the heat exchanger 10 to the inlet conduits 15. Once the exhaust gas passes through the heat exchanger 10 for releasing heat thereto, the exhaust gas is conducted through a conduit 11 to another location which can be, for example, a location for releasing the exhaust gas to the atmosphere. As the cleansed exhaust gases exit the second heat exchanger 10, they have cooled to a temperature relatively lower than their exit temperature from the first heat exchanger 18. For example, the cleansed exhaust gases may cool to approximately 350° Celsius. Even through the cleansed exhaust gases still contain heat energy, the gases are typically released to the atmosphere 11 at this stage.

As can be noted from the above-described illustrative description of the processing of exhaust gas from a textile machine, exhaust gases may initially be conducted to a combustion-type device for combusting pollutants, contaminants and other selected components of the exhaust gases, and thereafter the exhaust gases may be conducted through heat exchangers for releasing heat to newly exhausted gases and to the gases being introduced into the textile machine itself for use in the textile operation. Notably, such exhaust gases still contain unused heat energy following these process steps. Accordingly, the present invention provides a method and apparatus for converting heat energy of exhaust gases of a textile machine into another form of energy. Specifically, the exhaust gases are conducted to the compressor, combustion chamber and turbine of an electrical generator for converting heat energy of the exhaust gases into electrical energy, with the combustion chamber of the electrical generator being used for combustion of the contaminants and pollutants.

Figure 1:
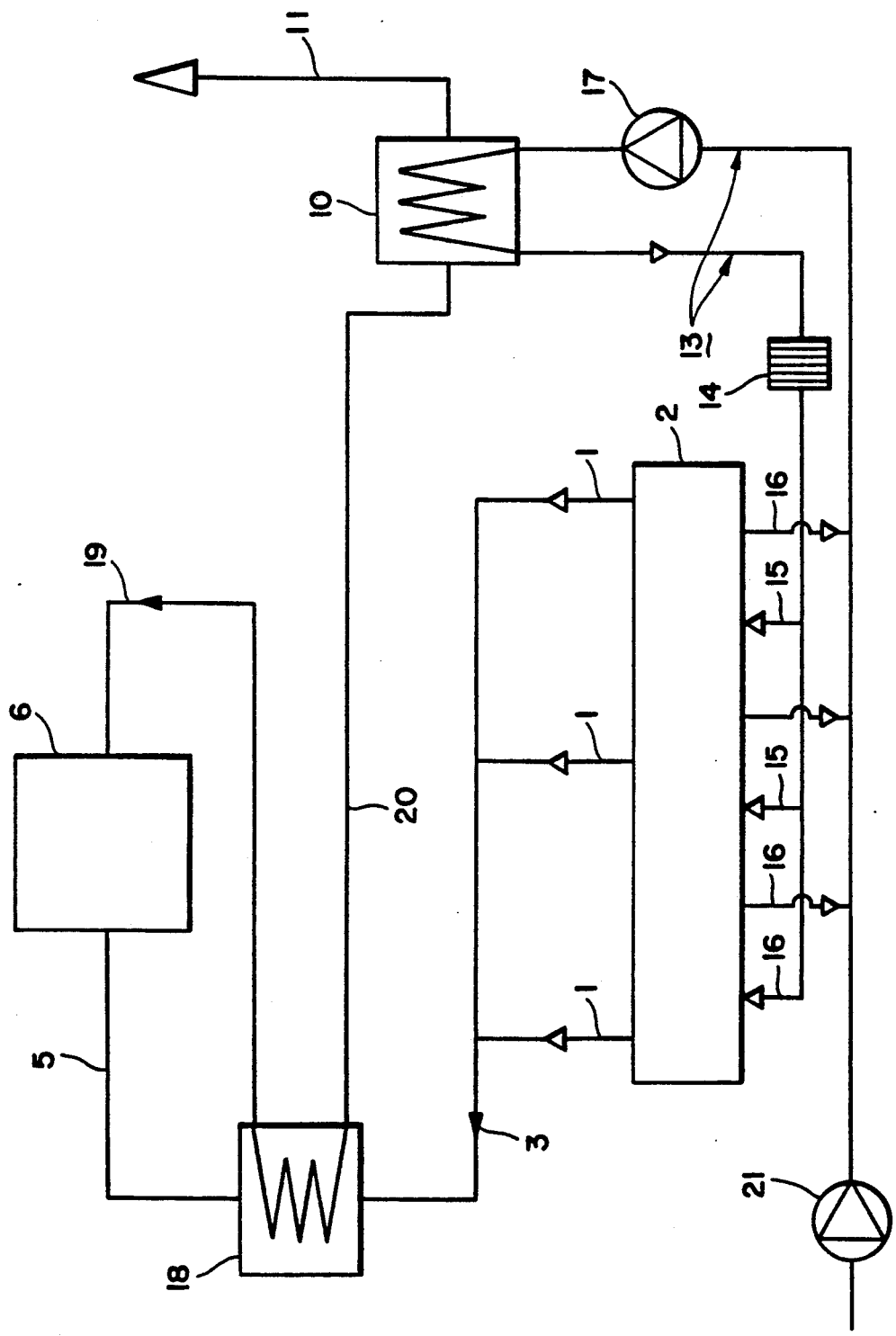
FIG. 1 is a schematic representation of one exemplary apparatus for implementing the method of the present invention.

In FIG. 1, an exemplary apparatus of the present invention for implementing the method of the present invention is illustrated. Exhaust gases 3 are exhausted through a plurality of exhaust outlets 1 from the treatment or drying chamber of a tenter frame 2 and these exhaust gases 3 are conducted through a conduit 5 to the compressor 4 of a conventional electric generator 7. The exhaust gases pass from the compressor 4 to a combustion chamber 6 of the electric generator 7. Thereafter, the exhaust gases 3 are conducted through the conduit 5 from the combustion chamber 6 to a gas turbine assembly 8 of the electric generator 7 for driving operation of the electric generator. The compressor 4 and the gas turbine assembly 8 are drivingly interconnected by a shaft 12 so that some of the mechanical energy of the gas turbine assembly 8 can be used to drive the compressor 4 and the remainder used to generate electricity.

Upon exiting the gas turbine assembly 8, the exhaust gases are conducted along a conduit 9 to a conventional heat exchanger 10 for releasing heat to heat the gases being fed to the drying chamber 2 of the tenter frame. The heat provided by the heat exchanger 10 is conducted through an air circulation passage 13 and introduced into the tenter frame 2 by a series of inlet conduits 15.

The electric energy produced by the electric generator 7, which includes energy converted from the heat energy of the exhaust gas, can be used to power the tenter frame which originally produced the exhaust gas as well as other textile machines.

The present invention also contemplates that the combustion chamber used to combust the exhaust gases could instead be a chamber which combusts a mixture of gas, oil or another fossil fuel and air to effect movement of a mechanical component such as a piston. In this aspect of the invention, the electric generator 7 would be replaced by a mechanical energy-producing device having a combustion chamber. The combustion of the fossil fuel and air mixture occurs when the mixture reaches a combustion temperature within the combustion chamber. The exhaust gases introduced into the combustion chamber of the electric generator would increase the efficiency of the combustion process since the exhaust gases are at a temperature greater than the temperature of the ambient air which would otherwise be introduced into the combustion chamber. Thus, less energy would be required to heat the fuel and exhaust gas mixture to a combustion temperature for combustion of the mixture.

The method of the present invention further contemplates that the exhaust gases, which still may comprise heat energy after their passage through the electric generator 7 or a mechanical energy-converting device, can be further conducted to heat exchangers associated with conventional heating equipment such as, for example, a steam boiler or a heating oil boiler, for enhancing the operation of the boiler.

The following hypothetical example illustrates the potential electrical energy which can be generated from an electrical generator operated in accordance with the present invention. If it is assumed that the volume of exhaust gas from the tenter frame is approximately 100,000 cubic meters per hour, this corresponds to an exhaust rate of approximately 100,000 kilograms per hour. If this exhaust gas is then ultimately conducted to an electrical generator having a 92% efficiency, the electrical generator would have a net output of approximately 100,000 kilowatts.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. A method for converting heat energy of hot exhaust gases conducted away from a treatment chamber of a textile machine into electrical energy, the treatment chamber of the textile machine being of the type in which textile material is subjected to a drying process, comprising:

introducing the hot exhaust gases conducted away from the treatment chamber into a combustion chamber for combustion of the exhaust gases;

conducting the exhaust gases combusted in said combustion chamber to a turbine for effecting driving operation of the turbine by the passage thereover of the exhaust gases;

subjecting the exhaust gases exiting said turbine to a heat exchange operation in which heat from the gases exiting said turbine is transferred to other hot exhaust gases conducted away from the treatment chamber for heating of the other exhaust gases; and re-introducing the other exhaust gases to the treatment chamber after these gases have been heated by said heat exchange operation.

2. The method according to claim 1 and characterized further by introducing the hot exhaust gases into a compressor of the electric generator for compression thereof prior to said introducing of the hot exhaust gases into the combustion chamber of the electric generator.

3. Apparatus for converting heat energy of hot exhaust gases conducted away from a treatment chamber of a textile machine into electrical energy, the treatment chamber of the textile machine being of the type in which textile material is subjected to a drying process, comprising:

a turbine;

a combustion chamber for combustion therein of contaminants and pollutants comprised in the exhaust gases;

a first exhaust gas conduit for introducing the hot exhaust gases conducted away from the treatment chamber into said combustion chamber;

an electric generator for generating electricity having a drive shaft operatably interconnected to said turbine for driving operation of said electric generator by said turbine;

a second exhaust gas conduit for conducting hot exhaust gases from said combustion chamber to said turbine to effect rotation of said electric generator drive shaft by said turbine;

heat exchange means operatively connected to said turbine for receiving exhaust gases exiting said turbine and operatively connected to the treatment chamber for receiving other exhaust gases conducted away therefrom, said heat exchange means being operable to transfer a portion of the heat energy of the exhaust gases exiting said turbine to the exhaust gases conducted to said heat exchange means from the treatment chamber; and re-introduction means for re-introducing the other exhaust gases conducted away from the treatment chamber to the treatment chamber following heating of the other exhaust gases during the heat transfer process in said heat exchange means.

4. The apparatus according to claim 3 and characterized further in that said electric generator has a compressor operatively connected to said combustion chamber for compression of the hot exhaust gases prior to their introduction into said combustion chamber.

* * * * *